March 16, 1954 J. M. HANERT 2,672,068

ELECTRICAL MELODY INSTRUMENT

Filed Sept. 27, 1948 2 Sheets-Sheet 1

Inventor
John M. Hanert
By Benjamin F. Wapper
Atty.

March 16, 1954 J. M. HANERT 2,672,068

ELECTRICAL MELODY INSTRUMENT

Filed Sept. 27, 1948

2 Sheets-Sheet 2

Inventor
John M. Hanert
By Benjamin F. Wupper
Atty.

Patented Mar. 16, 1954

2,672,068

UNITED STATES PATENT OFFICE 2,672,068

ELECTRICAL MELODY INSTRUMENT

John M. Hanert, Park Ridge, Ill., assignor to Hammond Organ Company, a corporation of Delaware Application September 27, 1948, Serial No. 51,409

11 Claims. (Cl. 84—1.01)

My invention relates generally to electrical musical instruments and more particularly to an improved instrument of this character for playing melodies, that is, playing but a single note at a time.

In prior electrical musical instruments of the melody type such for example that shown in the patent to Hammond et al. 2,233,258, an oscillator is tuned by selectively connecting different capacitances in an inductance-capacitance oscillator tuning circuit so as to change the resonant frequency thereof and thus tune the oscillator to the required frequency. In such oscillators the range through which the frequency of the oscillator may conveniently be tuned is relatively limited because of the fact that the sizes of capacitors required in order to make the oscillator tunable throughout a wide range, for example, three octaves, becomes a manufacturing problem as well as unduly increasing the cost of the instrument.

To obviate this difficulty, in the instrument of the above mentioned patent, the oscillator is tuned by capacitors through a range of but 12 semi-tones, and, in order to obtain frequencies below the range of the oscillator, the output of the oscillator is supplied to a cascaded series of frequency divider stages. In this type of instrument the oscillator is tuned to the same frequency upon the depression of corresponding keys in the several octaves of the keyboard, and it is therefore necessary to provide additional means such as a relay mechanism for selecting the particular divider stage from which the signal is to be taken dependent upon the particular octave in which the depressed key is located. The necessity of utilizing relays or similar octave selecting means introduces complications in the instrument and increases its cost of the manufacture.

In other forms of generators for melody instruments such as shown for example in my prior Patent 2,294,178 a single tapped inductance is utilized in the tuning circuit of the oscillator and the taps are selectively connected to ground through playing key operated switches. In instruments of this character the inductance has portions thereof short circuited when two or more keys are simultaneously depressed, such short circuiting of certain turns of the tuning inductance either results in stopping the oscillator, that is, decreasing its Q to such value that it can no longer operate as an oscillator, or results in tuning the oscillator to a spurious frequency not related in pitch to any of the simultaneously depressed keys. It is therefore necessary in instruments of this type to provide complicated switching circuits whereby the amplifier in the output of the instrument is rendered inoperative to transmit the signal when two or more keys are simultaneously depressed. This however, has a substantial disadvantage in that the instrument can no longer be played in a legato manner and the player must be very careful to depress the keys in a distinct staccato manner so that no two keys are depressed at the same time.

To overcome the foregoing complications and difficulties it is possible to utilize a tapped inductance in the tuning circuit of the oscillator and to connect the various taps selectively in the circuit to tune the oscillator to the desired pitch, but (as shown for example in the patent to L. Hammond, No. 2,274,199) such instruments require that the key operated switches be connected in series so that the opening of one of the switches renders the remaining switches ineffective to complete circuits. It is also necessary, as shown in said Patent No. 2,274,199, that the key operated switches be of the double-throw type, that is, they must not only make the connection to the tap but must break another circuit. Even the use of such complicated circuits, as in said Hammond patent, does not prove entirely satisfactory unless the key operated switches are so constructed that one circuit is broken at substantially the same instant that the other circuit is completed. If this is not done the oscillator has an opportunity, during the brief instant between the opening of one switch and closing the other, to generate spurious frequencies which will be heard as transients, key clicks, or thumps.

Furthermore, such inductance tuned oscillators as are shown in Patents No. 2,294,178 and 2,274,199 have the disadvantage that the oscillators cannot readily be tuned to the individual note frequencies to compensate for changes which may take place in the other components of the tuning circuit, such as changes in capacitance due to changes in humidity etc.

In accordance with the principles of the present invention the use of exact value incremental tuning capacitors, or tapped tuning inductances, or the necessity of providing octave selecting means, is avoided. This is accomplished principally by virtue of the provision of an oscillator which may readily be tuned by the depression of the playing keys (closing simple single-pole switches) through a range of at least three octaves, for example, from the frequency 523.225 C. P. S. of the note C4 to the frequency 3951.07 C. P. S. of the note B6. The oscillator is of unique construction in that while it is of the inductance-capacitance tuned type, the capacitance in the tuning circuit is maintained constant after initially tuning the instrument, whereas the inductance of the resonant circuit is changed by the depression of keys. This inductance comprises a plurality of individual spatially separated coils connected in series with provisions for connecting the junctions of these coils to ground by playing key operated switches. Thus in an instrument of this type there would be 36 individual coils separated sufficiently in space and so arranged as to have very little mutual reaction between coils for adjacent semitones, and connected so that depression of the highest note of the keyboard will connect one of these coils in the tuning circuit, depression of the second highest key will connect the first coil and an additional coil in the tuning circuit, etc. Thus the oscillator will operate at the frequency of the highest of a plurality of simultaneously depressed keys. This is the case particularly because the key operated switches connect the junctions between the series of coils to ground and thus if several keys are simultaneously depressed, those coils connected between the switches of the highest and lowest depressed keys have their terminals connected to ground.

The tuning of the oscillator by successive addition of series inductance coils in the tuning circuit as the frequency of the oscillator is to be decreased has the further advantage that the inductances of the coils may readily be changed in slight increments merely by moving one of the laminations in the core, or by moving the coil relative to the core laminations about which it is wound. This is a much simpler method of securing a desired inductance value than the method of selecting capacitors of desired value as was required in the instrument shown in the above mentioned Patent No. 2,233,258. Due to unavoidable variations in the capacitance of capacitors, it was necessary in the manufacture of the instrument disclosed in said patent (wherein the oscillator was tuned by changing the number of capacitors in series in the resonant circuit of the oscillator) to have available a large number of capacitors of slightly different values, and to select from this large number of capacitors a "matched" group for a particular instrument. The reason for this was, of course, that if the first capacitor of the series in the tuning circuit varies from its nominal value by a small fractional percent, the next capacitor in the series should, if possible, vary from its nominal value by the same fractional percent but of the opposite sign. The purpose of this is to avoid accumulation of deviations from the nominal capacitances. Furthermore, capacitors are subject to slight variations in capacitance, upon changes in temperature and humidity, and due to ageing. Such changes inevitably have an effect upon the tuning of the instrument. On the other hand the inductance of a coil does not noticeably change with the changes of humidity and temperature normally encountered, and does not change measurably with age.

By arranging the coils in such manner that the coils for adjacent semi-tone tuning are not adjacent each other but instead are physically separated from one another the coupling effect between the individual coils is made negligible even when two or more keys are simultaneously depressed.

It is therefore a primary object of my invention to provide an improved electrical musical instrument of the melody type employing an oscillator which is tuned to the required note frequency under the control of playing keys which respectively connect a plurality of individual inductance coils in series in the oscillator tuning circuit.

A further object is to provide an improved oscillator having an output wave consisting mainly of the fundamental and odd harmonic series.

A further object is to provide an improved instrument of the melody type which is provided with improved means for obtaining octave coupling, including means for determining whether the tones produced shall be primarily the odd harmonic series, that is, a tone quality similar to that of the clarinet, or whether the tone produced shall contain a long series of both the odd and even harmonics, that is, a tone of the string family.

A further object is to provide an improved electrical musical instrument of the melody type which is simple in construction and which is well adapted for quantity production, which will not require tuning over long periods of time, and which is capable of producing a wide variety of tonal effects.

Other objects will appear from the following description, reference being had to the accompanying drawings in which.

Figure 1:
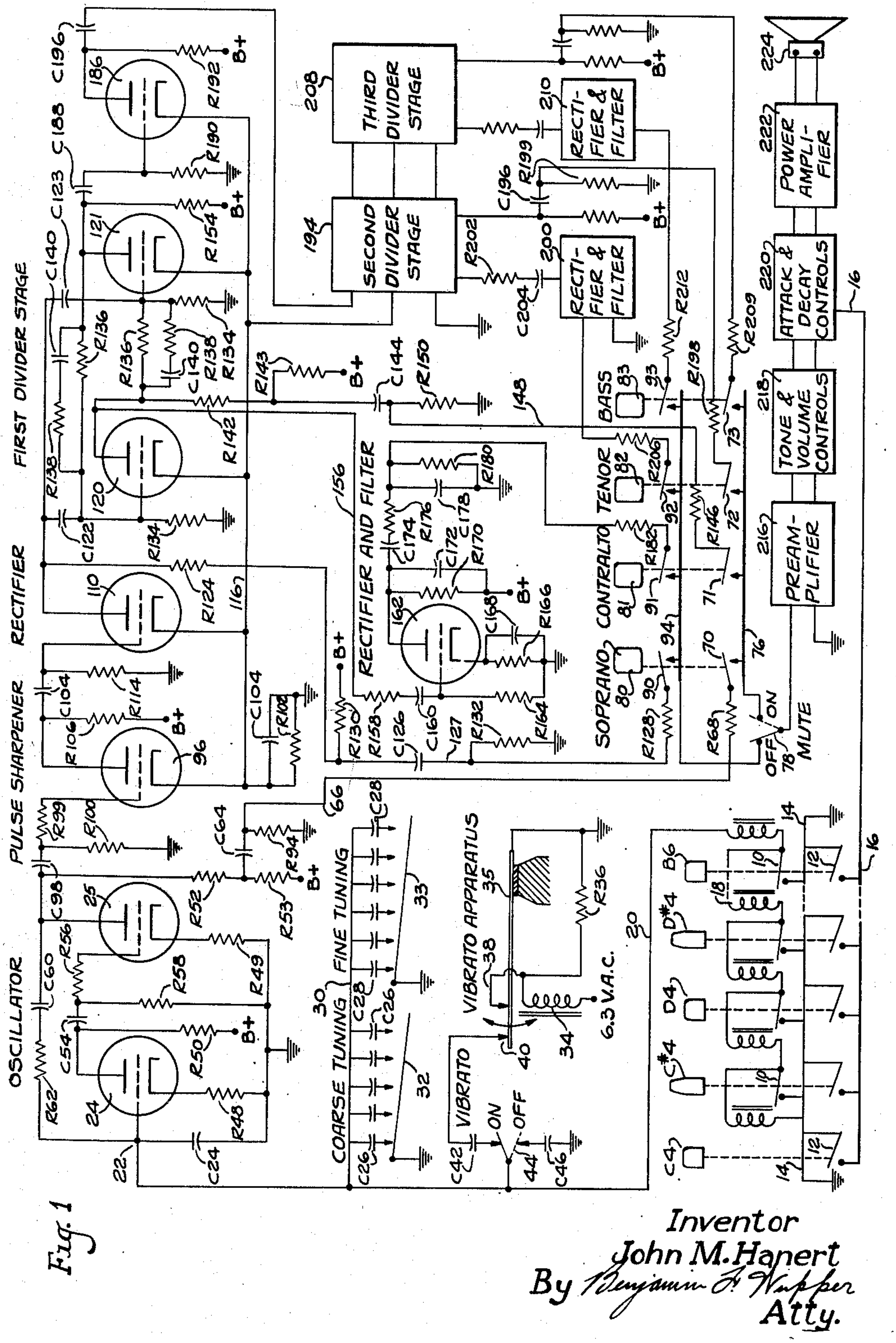
Fig. 1 is a schematic wiring and block diagram of the substantially complete instrument.

This application is a continuation in part of my application entitled Electrical Melody Instrument, Serial Number 753,994, filed June 11, 1947, now abandoned.

The instrument disclosed herein comprises a keyboard, which may be of the type shown in the aforesaid Patent 2,233,258 as well as shown in Hammond Patent 2,203,569, and comprises three octaves of keys C4 to B3, of which five representative keys are illustrated. Each of the keys operates two single pole single throw switches 10 and 12 (except the key C4 which operates only a switch 12), the mechanical connection between the keys and the switches being such that upon depression of a key its switch 10 will close prior to the closure of its switch 12. This is diagrammatically indicated in the drawing by showing the movable poles of the switches 10 as located closer to their fixed poles than those of the switches 12. The fixed poles of switches 10 and the movable poles of switch 12 are connected to a grounded bus 14, while all of the fixed poles of switches 12 are connected to a common bus 16. A plurality of tuning coils 18 are provided, these coils being connected in series and having the junctions between successive coils connected respectively to the movable poles of the switches 10. The last coil 18 of the series has its terminal connected to ground.

Figures 2, 3, 4, 5, 6:
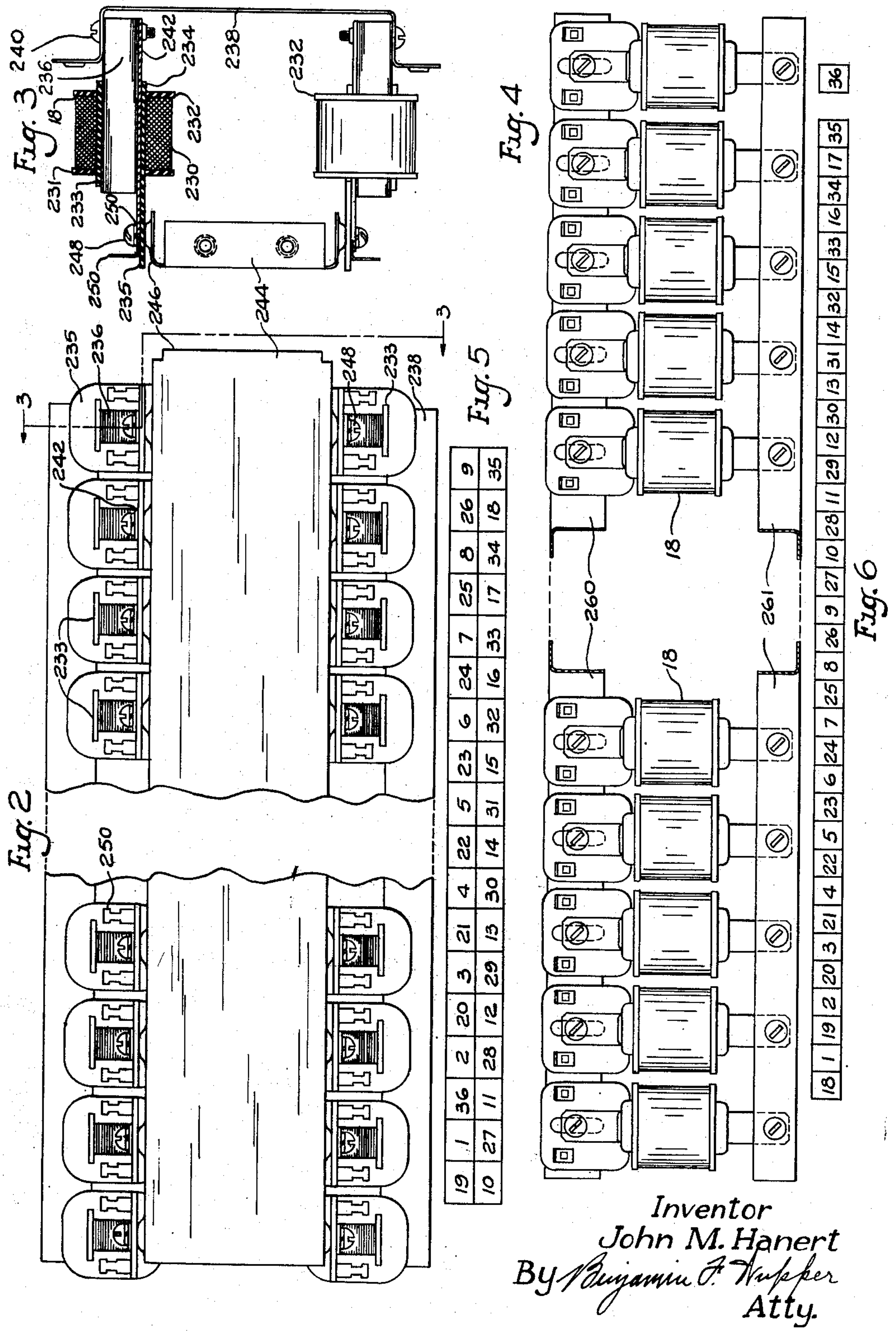
Fig. 2 is a plan view of the individual inductances used in the tuning circuit of the oscillator.
Fig. 3 is a transverse sectional view taken on the line 3—3 of Fig. 2.
Fig. 4 is a plan view of the individual inductances used for tuning the oscillator, arranged in a single line.
Fig. 5 is a diagram to show the arrangement of the tuning inductances as they appear in Fig. 2.
Fig. 6 is a diagram showing the arrangement of the tuning inductances as they appear in Fig. 4.

It is important that there be a minimum of linking of the magnetic flux produced by the several coils, that is, there shall be a minimum of mutual reaction between coils for adjacent semi-tones. To accomplish this purpose the coils 18 are not arranged in a sequential row but are preferably interspersed so that the possibility of mutual reaction is reduced to a minimum. In one form of the invention the coils are arranged in two staggered rows. Giving the coils ordinal numbers commencing with the last coil of the series, the first row of coils, as shown in Fig. 5, would comprise coils 19, 1, 36, 2, 20, 3, 21, 4, 22, 5, 23, 6, 24, 7, 25, 8, 26, 9 and the second row would comprise coils 10, 27, 11, 28, 12, 29, 13, 30, 14, 31, 15, 32, 16, 33, 17, 34, 18, 35. In some instruments it may be desirable to arrange the coils in a single row, in which event the arrangement is preferably as shown in Fig. 6. By thus interspersing the coils they may be placed very close together, and while the actual inductance is to a considerable degree affected by the close proximity of the coils, the inductance or tuning of the oscillator is nevertheless unaltered when two or more keys are depressed simultaneously and some of the coils are thereby short-circuited.

For instance, linkage between a low frequency coil and a high frequency coil is of no importance when playing a low frequency note because the number of turns on the high frequency coil are so small that the mutual interaction produces no appreciable change in total inductance. Likewise, when playing a high note, interaction with a low coil is of no importance because the low note coil is then out of the circuit (being shorted, in series with other coils, to ground). The coils which are most sensitive to mutual couplings are adjacent coils in the series of coils making up the tuning elements.

The coils which are utilized for tuning the oscillator to adjacent semi-tone intervals are not only separated in space by using the arrangements shown in Figs. 5 and 6, but are also magnetically shielded from each other because of the presence of the iron of the coil or coils lying between them. Thus when adjacent semi-tone keys are simultaneously depressed the short circuiting of the unused coil does not appreciably effect the inductance of the coil being used, that is, the coil which is associated with the higher of the two depressed keys. While the arrangement of the coils diagrammed in Figs. 5 and 6 are very satisfactory, it is of course not essential that either of these particular arrangements be used. The arrangement may be any one which sufficiently separates the tuning coils for adjacent semi-tone intervals. The separation may be in part physical and in part due to magnetic structure of the coils whereby the linkage between them is very low. If the iron flux paths of the coils are sufficiently complete so that there is very little stray magnetic flux, the coils for tuning the oscillator to adjacent semi-tone intervals may be placed adjacent one another whereas, if the magnetic structure of the coils is not such that the stray magnetism is very low it is highly desirable to separate the coils for tuning to adjacent semi-tones by sufficient spacing to prevent undesirable linkage.

It will thus appear that upon depression of any of the playing keys one or more of the inductance coils 18 is or are connected in series between the grounded bus 14 and a conductor 20 which leads to a junction point 22, the latter being also connected to the grid of a triode 24, which, together with a triode 25 and their associated circuit elements, constitute the oscillator. A fixed capacitor C24 is connected between the junction point 22 and ground, this capacitor forming the main capacitance of the resonant circuit of the oscillator, which circuit includes one or more of the inductance coils 18. To tune the oscillator initially to the desired frequency, there are provided a plurality of coarse tuning capacitors C26 and a plurality of fine tuning capacitors C28, each having one terminal connected to the junction 22 by a conductor 30, the coarse tuning capacitors C26 being adapted to have their other terminals successively connected to ground by a suitable switching means indicated as a grounded flexible member 32 which may be brought successively into contact with the other terminals of the capacitors C26. A similar flexible member 33 is indicated as a means for adjustably connecting capacitors C28 to ground. The coarse tuning capacitors C26 may be of such values that, as they are successively connected in the tuning circuit, the pitch at which the oscillator operates will change by about two semitones, whereas the fine tuning capacitors C28 are of such values that, as they are successively connected in the tuning circuit, the pitch of the oscillator will change by 1/5 of a semi-tone.

It is usually desirable in instruments of the melody type to provide means for introducing a vibrato effect, that is, a periodic change in pitch of approximately 3% at a vibrato rate of about 6 C. P. S. This is accomplished by the vibrato apparatus shown herein as comprising a grounded reed 35 having a natural frequency of vibration at the vibrato rate, the reed being of magnetic material so as to be magnetically attracted by a coil 34 which is connected between the terminals of a suitable source of alternating current, indicated as 6.3 V. A. C., and ground, an anti-spark resistor R36 being connected in series with the coil 34. The reed 32 as it swings upwardly from its center position, is adapted to engage a contact 38 which is connected between the coil 34 and resistor R36 and thus in this above center position shunts the resistor R36. R36 is of such value, for example 180 ohms, that it greatly reduces the curent flow through the coil 34 when the switch 38 is open. In this way the reed 35 is maintained in vibration. The purpose of the reed 35 is to engage a contact 40 throughout the time that the reed is above its central position and to break this contact during the time that the reed is below its center position. The contact 40 is connected to one pole of a capacitor C42, the other pole of which may be connected by a switch 44 with the conductor 20. When the switch 44 is in the position shown in full lines, the capacitor 42 will be effectively connected in the tuning circuit in parallel with the capacitor C24 during one half of the cycle of the reed 35, and will be disconnected therefrom during the other half of each cycle of oscillation of the reed. Thus the frequency at which the oscillator operates will be slightly higher than its nominal frequency when the reed is not engaging contact 40 and will be slightly lower than its nominal frequency when the reed is engaging this contact 40, in this way producing the well known vibrato effect. When the switch 44 is moved to the position in which it is shown in dotted lines, it connects a compensating capacitor C46 between ground and the conductor 20, the compensating capacitor C46 having a value approximately half that of the capacitor C42 so that when the vibrato is not to be used, the oscillator will operate at a frequency substantially the mean of the two frequencies at which it alternately operates when the vibrato effect is to be obtained, this is, when the switch 44 is in its full line position.

The oscillator, as previously indicated, comprises triodes 24, 25 which may be in a single envelope. The cathodes of the triodes 24 and 25 are connected to ground through self-bias resistors R48 and R49. The anode of triode 24 is connected to a suitable source of current indicated as a +B terminal through a load resistor R50, while the anode of triode 25 is connected to a B+ terminal through voltage divider resistors R52 and R53 which together form a load for the triode 25. The anode of triode 24 is connected to the grid of triode 25 through a blocking capacitor C54 and a series grid resistor R56, the junction between C54 and R56 being connected to ground through a grid return resistor R58. The anode of triode 25 is connected to the grid of triode 24 through a capacitor C60 and a resistor R62 to provide a feedback path. This oscillator, due in part to the provision of the series grid resistor R56, produces an output wave on the anode of triode 25 which is nearly rectangular in shape. A wave of this character consists substantially exclusively of a fundamental with a long series of its odd harmonics.

In operation the triode 24 functions in the manner of either a class A or class C amplifier (in neither case drawing grid current) and thus the signal appearing on its grid terminal 22 appears in opposite phase on its plate. Triode 25 operates in a non-linear manner to cut off its plate current when its relatively large grid signal is negative and further limits its plate current when its grid signal is positive. The positive limiting effect is made possible by means of series grid resistor R56. This resistor R56 functions to prevent further increase in signal amplitude at the grid itself when any grid current is drawn. This is because the internal input impedance of the tube 25 becomes very low in comparison with R56 when the grid becomes positive with respect to its cathode. Furthermore, resistor R56 functions to prevent the capacitor C54 from building up a negative bias which would thereby cause triode 25 to operate in a class C manner to produce positive pulses at its output instead of the rectangular wave, which is musically desirable because of its odd harmonic series. The series resistor R56 is made large in comparison with the shunt resistor R58 so that the charge on capacitor C54 is substantially unaffected by the grid rectification in triode 25. A still further advantage in including resistor R56 is that changes in the voltage of signal at the anode of tube 24 are not effective to change the D. C. voltage across the capacitor C54. Therefore capacitor C54 can be made relatively large so as to prevent any undesirable phase shift within the oscillator frequency range, and a minimum of trouble is encountered even if there are large changes in the impedance of the tuned mesh. Such changes would result in large amplitude changes on the plate of tube 24 which in turn would change the charge across the condenser C54—were the resistor R56 omitted.

Therefore the inclusion of resistor R56 serves not only to cause tube 25 to operate non-linearly but also prevents the development of a bias voltage across the relatively large capacitor C54, which bias would cause stopping of the oscillator when playing legato from a note at which the resonant mesh impedance is high (thereby causing the self-bias voltage to be developed) to a note at which the resonant mesh impedance is relatively low. If this were to happen the change in the bias voltage across capacitor C54 would be of such a value as to cut off the tube 25, thereby causing cessation of oscillation for a period related to the time constant of C54 and R58. As explained above this time constant should be long by comparison to the periodicity of the lowest note, so that no undesirable phase shift will occur. By inclusion of R56 this time constant problem is obviated and the oscillator does not stop oscillating. In a particular circuit which I found satisfactory the tube 24 may be one half of a 6SL7 and the tube 25 may be a 6SN7. The value of R56 is .1 megohm and R58 is .05 megohm.

The signal appearing on the plate of the triode 25 is utilized in the output of the instrument, the signal being transmitted through a blocking capacitor C64, having one terminal connected to the junction between the voltage dividing resistors R52 and R53 and having its other terminal connected to a conductor 66 which leads through a decoupling resistor R68 to a switch 70 forming part of a series of register control switches including switches 71, 72 and 73. This group of switches is adapted to make connection to a bus bar 76, which by operation of a mute control switch 78, is adapted to be connected to the output of the instrument as will hereinafter appear. The switches 70 to 73 are operated by stop tablets or control keys 80, 81, 82, and 83 respectively for the soprano, contralto, tenor and bass pitches, these tablets also operating switches 90, 91, 92, and 93 respectively which make contact with a bus bar 94 which may also be connected to the output of the instrument by the switch 78. To filter undesirable frequencies from the signal appearing upon the conductor 66 there is a resistor R94 connecting this conductor to ground.

The signal produced by the oscillator is also impressed upon the grid of pulse sharpening triode 96 through blocking capacitor C98 and a series grid resistor R99. The junction between C98 and R99 is connected to ground through the usual grid return resistor R100. The cathode of triode 96 is connected to ground through a self-bias resistor R102 which is shunted by a bypass capacitor C104. Plate current is supplied to the anode of triode 96 from a suitable source indicated as B+ through a load resistor R106. Due principally to the provision of the series grid resistor R99 and the non-linear operation of triode 96, the peaks of the signal wave produced by the oscillator will be sharpened so as to comprise a steep front rectangular wave suitable for reliable operation of an alternate pulse responsive frequency divider stage. The output of the triode 96 is impressed upon the grid of a rectifier triode 110 through a current-limiting capacitor C104, the grid of triode 110 being connected to ground through a grid resistor R114. The cathode of this tube is connected to a conductor 116 which is also connected to the cathode of tube 96 so that the self-bias resistor R102 and its bypass condenser C104 also provide the bias for the triode 110, as well as for other stages. The rectifier 110 operates to remove the negative peaks from the wave constituting the output of triode 96 and transmitting the positive pulses to the grids of triodes 120 and 121 forming parts of the first alternate pulse responsive divider stage, these pulses being transmitted through blocking condensers C122 and C123.

The output signal of the triode 110 is also transmitted through a resistor R124, capacitor C126 and a decoupling resistor R128 to the movable pole of switch 90. Plate current is supplied to the triode 110 from a B+ terminal through a load resistor R130 which is in series with R124. The conductor 127 which joins capacitor C126 and resistor R128 is connected to ground through a resistor R132, this resistor with the capacitor C126 being effective to filter undesirable frequencies from the signal supplied by the rectifier 110. The grids of triodes 120, 121 are connected to ground through suitable grid resistors R134 while the anode of each of these triodes is connected to the grid of the other through similar meshes, each including a series resistor R136 which has in parallel therewith, a circuit including a resistor R138 and capacitor C140 in series. The anode of triode 120 is supplied with plate current from a B+ terminal through voltage dividing resistors R142 and R143 which also constitute the plate load on this triode, the junction between these resistors being connected through a blocking capacitor C144 and through a decoupling resistor R146 to the movable pole of switch 71. The conductor 148 which connects C144 with R146 is connected to ground by a filtering resistor R150. The signal appearing at the plate of triode 120 is thus transmitted to the switch 71, this signal being of a symmetrical shape, that is a tone comprising solely the fundamental and its odd harmonics.

Plate current is supplied to the triode 121 from a B+ terminal of the power supply through a load resistor R154 while the cathodes of the triodes 120 and 121 are connected to the common cathode conductor 116.

In addition to the signal output circuit which is supplied to the switch 71 through the capacitor C144, a signal from the plate of the triode 120 is transmitted through a conductor 156, resistor R158, and blocking capacitor C160 to the grid of a rectifier triode 162. The grid of this triode is connected to ground through a grid resistor R164 while the cathode is connected to ground through a relatively large self-bias resistor R166 which has a by-pass capacitor C168 connected in parallel therewith. Plate current is supplied to the triode 162 from a B+ source through a load resistor R170 which has a filtering capacitor C172 connected in parallel therewith. The signal from the plate of the triode 162 passes through a blocking capacitor C174 and a resistor R176 to a low pass filtering mesh comprising a capacitor C178 and R180 in parallel. These filtering meshes attenuate the signal approximately 12 db per octave and the signal that is attenuated is supplied through a decoupling resistor R182 to the switch 91. The signal thus appearing at the switch 91 comprises a fundamental and a long series of both odd and even harmonics, corresponding to the positive pulses of the input signal. Negative pulses of the input signal are cut off because of the high bias resistor in the cathode circuit.

The signal on the plate of triode 121 is impressed upon the grid of a rectifier triode 186 through a blocking capacitor C188, the grid of triode 186 being connected to ground through a grid resistor R190. Plate current is supplied to the plate of triode 186 through a suitable resistor R192 and the output of this triode is coupled to the second divider stage, indicated by the block 194, through a blocking capacitor C196. The second divider stage 194 may be identical with the first divider stage except for possible slight changes in the values of some of the circuit elements to secure more reliable operation at the reduced frequency. This second divider stage supplies an odd harmonic signal to the switch 72 through a capacitor C196 and decoupling resistor R198, the conductor connecting C196 and R198 being connected to ground through a resistor R199. A signal is also supplied from the second divider stage to a rectifier and filter 200 through a resistor R202 and capacitor C204. The rectifier and filter 200 may be the same as that above described as including the triode 162, except for slight variations in the values of the circuit elements, particularly the filtering mesh, to accord with the lower frequencies transmitted thereby. The output of the rectifier 200 is transmitted to the switch 92 through decoupling resistor R206.

The second divider stage also transmits a pulse for the control of a third divider stage 208, which through circuit elements similar to those previously described transmits a signal generally of rectangular wave form and hence containing the odd harmonics, through decoupling resistor R209, and a signal to a rectifier and filter 210, which operates as does the rectifier 162 to provide a signal containing both the odd and even harmonics, this signal being transmitted to the switch 93 through a suitable decoupling resistor R212.

Depending upon the position of the mute switch 78, signals collected by either the bus 94 or the bus 76 are supplied to a preamplifier 216 which transmits the amplified signal to suitable tone and volume controls 218. These controls may be similar to those shown in the aforesaid Patent 2,233,258. The signal, as modified by the tone and volume controls, is supplied to attack and decay controls 220. These controls may be of a nature similar to those disclosed in the aforesaid Patent 2,233,258 their operation being dependent upon the connection of conductor 16 to ground through one of the switches 12. The signals from these controls is amplified by a power amplifier 222 and translated into sound by a speaker 22.

Using the instrument of my invention the player may first select the octave coupler effects desired by operating one or more of the tablets 80 to 83 to maintain their associated switches closed. The musician also operates the tone controls 218 and the mute switch 78 to obtain the tone quality registration desired in the particular selection to be rendered. The musician also has the option of determining whether the tone shall or shall not include the vibrato effect, this being accomplished by suitably positioning the switch 44. The instrument may then be played in the usual manner of a melody instrument. When any one of the keys C#4 to B6 is depressed it first closes its associated switch 10 thereby connecting the required number of coils 18 in the resonant tuning circuit of the oscillator 24, 25 so as to cause the latter to change to the required frequency. After this has occurred the switch 12 will be closed and through the attack and control circuits 220, render the output system capable of transmitting the signal to the speaker 224. When no keys are depressed all of the coils 18 are effective in the resonant circuit of the oscillator, and the latter is tuned to its lowest note frequency, that of the key C4. Depression of the latter key thus merely closes its switch 12, to render the amplifier 220 effective to transmit the tone signals.

As shown in Figs. 2 and 3 each of the coils 18 comprises a winding 230 mounted on a coil form comprising interlocked insulating members 231, 232, 233, and 234. The member 234 has a forwardly projecting portion 235. Each of the forms fits over a plurality of iron laminations 236 which are secured to a bottom frame plate 238 by bolts 240, each of the groups of laminations having a bar 242 of the same general shape as the laminations 236 but considerably longer secured with the laminations to the back plate 238. The bar 242 is preferably made of brass or similar nonmagnetic sheet metal. A front plate 244, having suitable flanges 246 along its longitudinal edges, forms an upper end support for the form part 235 and the end of the nonmagnetic bar 242 of each of the coils. The form part 235 and the nonmagnetic bar 242 are clamped to the flange 246 of the top plate 244 by screws 248.

The coil form parts (230 to 235) are slidable as a unit relative to the laminations 236 and the nonmagnetic bar 242, being clamped in adjusted position by tightening the screw 248 which is provided with suitable lock washer 250 so as to hold the parts rigidly in adjusted positions. By sliding the coil winding 230 together with its form relative to laminations 236 the effective inductance of the coil may be varied through small increments. It will be noted that the coils are rigidly held between the plates 238 and 244 so as to prevent accidental movement relative to each other and also to prevent movement of the coils 230 relative to their core laminations 236. Terminal lugs 250 may conveniently be riveted to the coil form part 235. It will therefore be seen that when it is required to tune the oscillator, so that depression of the keys will result in tuning it exactly to the correct semi-tone intervals, this may be accomplished very easily by unscrewing the screws 248 and shifting the coil assemblies relative to their laminations 236 until the oscillator is tuned exactly to the required frequency. After this the coils may be clamped in adjusted position by tightening the screws 248.

When initially designing the coils the number of turns on each may be computed on the basis that the coils are completely independent of each other magnetically. As pointed out heretofore, this is not the case because there is a very considerable magnetic linkage between adjacent coils. However, by using the number of turns which would be theoretically correct for the coils completely independent magnetically a fairly close approximation to the correct number of turns is obtained. The coils are then assembled on their cores at a position which is the electrical mean, and under these conditions all coils will occupy the same relative location on their cores as shown in Fig. 4. After this is done, and the coils are locked in position by tightening screws 248, the instrument is carefully tuned by adding or removing small numbers of turns to each of the coils, except the first coil which is used as a standard. From this procedure the exact number of turns is determined for each of the coils and in the manufacture of the instrument these numbers of turns are always used, and when the coils are first assembled each is placed in its electrical median position. It is then found that the instrument is in nearly correct tune, but that small changes in the order of not more than a 1/32" motion of the coils in either direction from their main positions is necessary to bring the various notes of the scale in exact time. It is important in the beginning that all the coils be assembled on their supports as shown in Figs. 2 and 3, before any tuning is done, because as heretofore explained the presence of unused coils has a decided tuning effect upon those coils which are connected in the tuning circuit of the oscillator.

When the space available for the tuning coils is long and narrow, the coil arrangement shown in Fig. 4, and diagrammed in Fig. 6, may be employed. In this arrangement the coils 18 are mounted between a pair of angles 260, 261, which may be rigidly secured to the casing of the instrument. One suitable arrangement of the coils is indicated in the diagram Fig. 6. This arrangement is not unique, but is representative of a variety of arrangements by which undesirable intercoupling effects may be minimized.

From the foregoing it will appear that the instrument disclosed herein is extremely simple in construction and operation but is nevertheless capable of supplying a wide variety of musical tones both of the string type and of the clarinet or odd harmonic series type, either with or without a vibrato effect.

It will be understood that the use of physically separated serially connected inductance elements for tuning may be used with many types of oscillators other than that disclosed herein, such, for example, as inductance-resistance phase shift oscillators, relaxation oscillators, etc.

As used herein, in describing the inductance elements, the terms "electrically adjacent in the series" and "directly connected' are intended to mean that the elements have terminals which are connected by a conductor of substantially no impedance.

While I have shown and described a particular embodiment of my invention, it will be apparent to those skilled in the art that numerous modifications and variations may be made in the form and construction thereof, without departing from the principles of the invention. I therefore desire by the following claims, to include within the scope of my invention all such similar and modified forms of the apparatus disclosed, by which substantially the results of the invention may be obtained by substantially the same or equivalent means.

I claim:

1. In an electrical musical instrument of the melody type, the combination of a plurality of playing keys, a plurality of physically separate inductance elements, one for each of the playing keys and located in a physically regular pattern so that any two of the elements which are electrically adjacent in the series are separated by another element, electrical connectors connecting the inductance elements in series, an oscillator having a tuning circuit including a capacitor and a determinable number of said inductance elements, a terminal of relatively fixed potential, and circuit means including switches respectively operated by the playing keys to effect electrical connections between said connectors and said terminal to determine the number of inductance elements which shall be connected in the tuning circuit of the oscillator, and thus to determine the frequency of operation of the latter.

2. In an electrical musical instrument of the melody type, the combination of a plurality of playing keys, a plurality of physically spaced separate inductance elements electrically connected in series, an oscillator having a resonant tuning circuit including a capacitor and a determinable number of said inductance elements, and circuit means including switches operated by the playing keys to determine the number of inductance elements which shall be connected in the resonant circuit of the oscillator and thereby to determine the frequency of operation of the latter.

3. In an electrical musical instrument of the melody type, the combination of a plurality of playing keys, a plurality of physically separate inductance elements connected in series, an oscillator having a tuning circuit including a determinable number of said inductance elements, and circuits including switches operated by the playing keys to determine the number of inductance elements, always commencing from one end of the series of elements which shall be connected to the tuning circuit of the oscillator and thereby to determine the frequency of operation of the latter.

4. In an oscillator for electrical musical instruments, the combination of an electron discharge device oscillator including a resonant circuit for determining the frequency of oscillation, said resonant circuit comprising a fixed capacitor, two groups of tuning capacitors of small value relative to that of the fixed capacitor, the values of the capacitors of one group being such that the parallel capacitance of the group approximates the capacitance of each of the capacitors of the other group, means for selectively connecting one or more of said tuning capacitors in parallel with the fixed capacitor, a plurality of magnetically separate inductance elements connected in series, and key operated means for selectively connecting one or more of the inductance elements in parallel with the fixed capacitor.

5. In an oscillator for electrical musical instruments, the combination of an electron discharge device oscillator including a resonant circuit for determining the frequency of oscillation, said resonant circuit comprising a fixed capacitor, a plurality of tuning capacitors of small value relative to that of the fixed capacitor, means for selectively connecting one or more of said tuning capacitors in parallel with the fixed capacitor, a series of separate inductance elements connected in series, and key operated means for selectively connecting in parallel with the fixed capacitor one or more of the inductance elements in series.

6. In an electrical musical instrument of the melody type, the combination of a plurality of playing keys, a plurality of physically separate series connected inductance elements associated respectively with the playing keys, an oscillator having a tuning circuit selectively including one or more of the inductance elements, and circuits respectively including switches operated by the playing keys, said switches being operable to connect the inductance elements associated with that key and all other keys for pitches of higher frequency in the tuning circuit, and effectively to disconnect the inductance elements associated with all lower pitch keys from the tuning circuit.

7. In an electrical musical instrument of the melody type, the combination of a keyboard comprising a plurality of playing keys, a plurality of physically separate series connected inductance elements associated respectively with the playing keys, means to support said elements in an arrangement such that inductance elements which are directly connected are physically not adjacent one another, an oscillator having a tuning circuit selectively including one or more of the inductance elements, and switches operated by the playing keys, said switches being operable to connect in the tuning circuit the inductance elements associated with the operated key and all other keys nearer one end of the keyboard, and effectively to disconnect from the tuning circuit the inductance elements associated with all keys nearer the other end of the keyboard.

8. An oscillator comprising a pair of series connected electron discharge devices, each having at least a cathode, control grid, and plate; a grid voltage source; a coupling between the plate of the first device and the grid of the second device including a first relatively high value resistor having a first terminal connected with the grid of the second device and a second terminal coupled with the plate of the first device and a second relatively low value resistance connecting the second terminal of the first resistor with the source; a feed back connection between the plate of the second device and the grid of the first device including a third resistance in series; a tuning inductance capacitance circuit connecting the grid of the first device with the source to determine the frequency of oscillation; means to vary the reactance of one of the components of the tuning circuit; and an output circuit coupled to the second device; whereby said resistance in series with the grid of the second device is effective to limit the flow of plate current in the second device and thereby to make the signal in the output circuit of said second device of rectangular wave shape, representative of a tone having a musically desirable series of odd harmonics.

9. In an electrical musical instrument of the melody type, the combination of a plurality of playing keys, a plurality of physically separate inductance elements connected in series, each of said inductance elements including a coil and a core, and means securing said coil and at least a part of the core in any selected one of a large plurality of different relative positions, an oscillator having a tuning circuit including a selectable number of said inductance elements, and switches operated by the playing keys to select the number of inductance elements which shall be connected in the tuning circuit of the oscillator and thereby to determine the frequency of operation of the latter.

10. In an electrical musical instrument of the melody type, the combination of a plurality of playing keys, a plurality of physically separate inductance elements, electrical connectors connecting the elements in series, supporting means holding the inductance elements so that any two elements joined by one of said electrical connectors are separated physically from each other by at least one other element, an oscillator having a tuning circuit including a selected number of said inductance elements, and circuits respectively including switches operated by the playing keys to select the number of inductance elements which shall be connected to the tuning circuit of the oscillator and thereby to determine the frequency of operation of the latter.

11. In an electrical musical instrument of the melody type, the combination of a plurality of playing keys, a tuning switch for each of said keys which is closed upon operation thereof, a common electrical connection to one contact of each of said switches, an electrical connection between said common connection and a point of relatively fixed potential, an electronic oscillator having a variable inductance circuit for tuning the oscillator over the pitch range of said musical instrument, said circuit consisting of a plurality of physically separate inductance elements having electrical connectors connecting these elements in series, and electrical connections between said connectors and the other of said tuning switch contacts respectively, whereby the inductive reactance required for low frequency operation of the oscillator is efficiently and economically obtained as the sum total of those individual inductance elements which are electrically effective when a corresponding low pitched playing key is depressed.

JOHN M. HANERT.

References Cited in the file of this patent

UNITED STATES PATENTS

| Number | Name | Date |
|---|---|---|
| 2,209,982 | Kirkwood | Aug. 6, 1940 |
| 2,276,390 | Hanert | Mar. 17, 1942 |
| 2,429,226 | Hanert | Oct. 21, 1947 |
| 2,455,472 | Curl et al. | Dec. 7, 1948 |